United States Patent
Sato et al.

(10) Patent No.: US 11,676,638 B2
(45) Date of Patent: Jun. 13, 2023

(54) SPINDLE MOTOR AND DISK DRIVE DEVICE INCLUDING THE SAME

(71) Applicant: NIDEC CORPORATION, Kyoto (JP)

(72) Inventors: Kazuhiro Sato, Kyoto (JP); Masahiro Imahori, Kyoto (JP); Junya Mizukami, Kyoto (JP); Shingo Suginobu, Kyoto (JP); Tomoki Uchibori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/711,039

(22) Filed: Apr. 1, 2022

(65) Prior Publication Data
US 2022/0319547 A1 Oct. 6, 2022

(30) Foreign Application Priority Data

Apr. 1, 2021 (JP) .............................. JP2021-062978
Apr. 8, 2021 (JP) .............................. JP2021-065669

(51) Int. Cl.
*G11B 25/04* (2006.01)
*G11B 19/20* (2006.01)

(52) U.S. Cl.
CPC ........ *G11B 25/043* (2013.01); *G11B 19/2009* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 10,825,476 B2* | 11/2020 | Hanzel | G11B 19/2036 |
| 2009/0231754 A1* | 9/2009 | Sekii | F16C 33/1085 |
| | | | 384/114 |
| 2011/0122530 A1* | 5/2011 | Sekii | H02K 3/50 |
| | | | 310/71 |
| 2012/0162818 A1* | 6/2012 | Sugi | F16C 33/74 |
| 2013/0050872 A1* | 2/2013 | Sekii | H02K 1/146 |
| | | | 310/71 |
| 2014/0362470 A1* | 12/2014 | Taki | H02K 15/12 |
| | | | 310/71 |
| 2015/0022919 A1* | 1/2015 | Matsuyama | H02K 15/0062 |
| | | | 360/99.08 |

(Continued)

FOREIGN PATENT DOCUMENTS

JP 2020058217 4/2020

*Primary Examiner* — William J Klimowicz
(74) *Attorney, Agent, or Firm* — Jciprnet

(57) ABSTRACT

A spindle motor includes a base, a shaft arranged on the base and extending in a vertical direction, a stator having a coil defined by a wound conductive wire and arranged on an upper surface of the base, and a rotor rotatably supported around the shaft. The base has a through hole that penetrates the base from the upper surface to a lower surface. The conductive wire is drawn out to the lower surface side through the inside of the through hole. The through hole is sealed by a sealing material. The through hole includes a columnar lower column body and a columnar upper column body. The lower column body is arranged on the lower surface side of the base. A cross-sectional area of the upper column body orthogonal to an axial direction is smaller than a cross-sectional area of the lower column body orthogonal to the axial direction.

12 Claims, 3 Drawing Sheets

(56) References Cited

U.S. PATENT DOCUMENTS

| | | | | |
|---|---|---|---|---|
| 2016/0164364 A1* | 6/2016 | Yoneda | ............... | H02K 11/30 |
| | | | | 310/71 |
| 2018/0336926 A1* | 11/2018 | Suginobu | ............... | H05K 1/118 |
| 2020/0105299 A1* | 4/2020 | Showa | ............... | H02K 5/225 |
| 2020/0143832 A1* | 5/2020 | Hanzel | ............... | G11B 19/2036 |

* cited by examiner

SPINDLE MOTOR AND DISK DRIVE DEVICE INCLUDING THE SAME

CROSS REFERENCE TO RELATED APPLICATIONS

The present application claims priority under 35 U.S.C. § 119 to Japanese Application No. 2021-062978 filed on Apr. 1, 2021 and Japanese Application No. 2021-065669 filed on Apr. 8, 2021. The entire contents of which are hereby incorporated herein by reference.

FIELD OF THE INVENTION

The disclosure relates to a spindle motor and a disk drive device including the same.

BACKGROUND

A conventional spindle motor includes a base plate, a shaft, a stator, and a rotor. The stator is arranged on the upper surface of the base and has a coil defined by a wound conductive wire. The base has a through hole penetrating the base from the upper surface to the lower surface. The conductive wire is drawn out to the lower surface side through the inside of the through hole, and the through hole is sealed by a sealing material.

However, in the conventional spindle motor, when the sealing material is filled in the through hole, bubbles may be generated in the sealing material and deteriorate the sealability in the through hole. In addition, the sealing material may not be filled up to the end of the through hole and deteriorate the sealability in the through hole.

SUMMARY

A spindle motor according to an exemplary embodiment of the disclosure includes a base, a shaft, a stator, and a rotor. The shaft is arranged on the base and extends in a vertical direction. The stator includes a coil defined by a wound conductive wire and is arranged on an upper surface of the base. The rotor is rotatably supported with the shaft as a central axis. The base has a through hole that penetrates the base from the upper surface to a lower surface. The conductive wire is drawn out to a lower surface side through inside of the through hole. The through hole is sealed by a sealing material. The through hole includes a columnar lower column body and a columnar upper column body. The lower column body is arranged on the lower surface side of the base. The upper column body is arranged on the upper surface side of the base with respect to the lower column body. A cross-sectional area of the upper column body orthogonal to an axial direction is smaller than a cross-sectional area of the lower column body orthogonal to the axial direction.

The above and other elements, features, steps, characteristics and advantages of the present disclosure will become more apparent from the following detailed description of the exemplary embodiments with reference to the attached drawings.

DETAILED DESCRIPTION

Hereinafter, exemplary embodiments of the disclosure will be described in detail with reference to the drawings. In the present application, the direction parallel to a central axis C is referred to as "axial direction," the direction orthogonal to the central axis C is referred to as "radial direction," and the direction along an arc centered on the central axis C is referred to as "circumferential direction." Further, in the present application, the shape and positional relationship of each portion will be described with the axial direction as the vertical direction and with the cover side with respect to the base as the upper side. However, this definition of the vertical direction is not intended to limit the orientation of the spindle motor and the disk drive device according to the disclosure when used.

Figure 1:
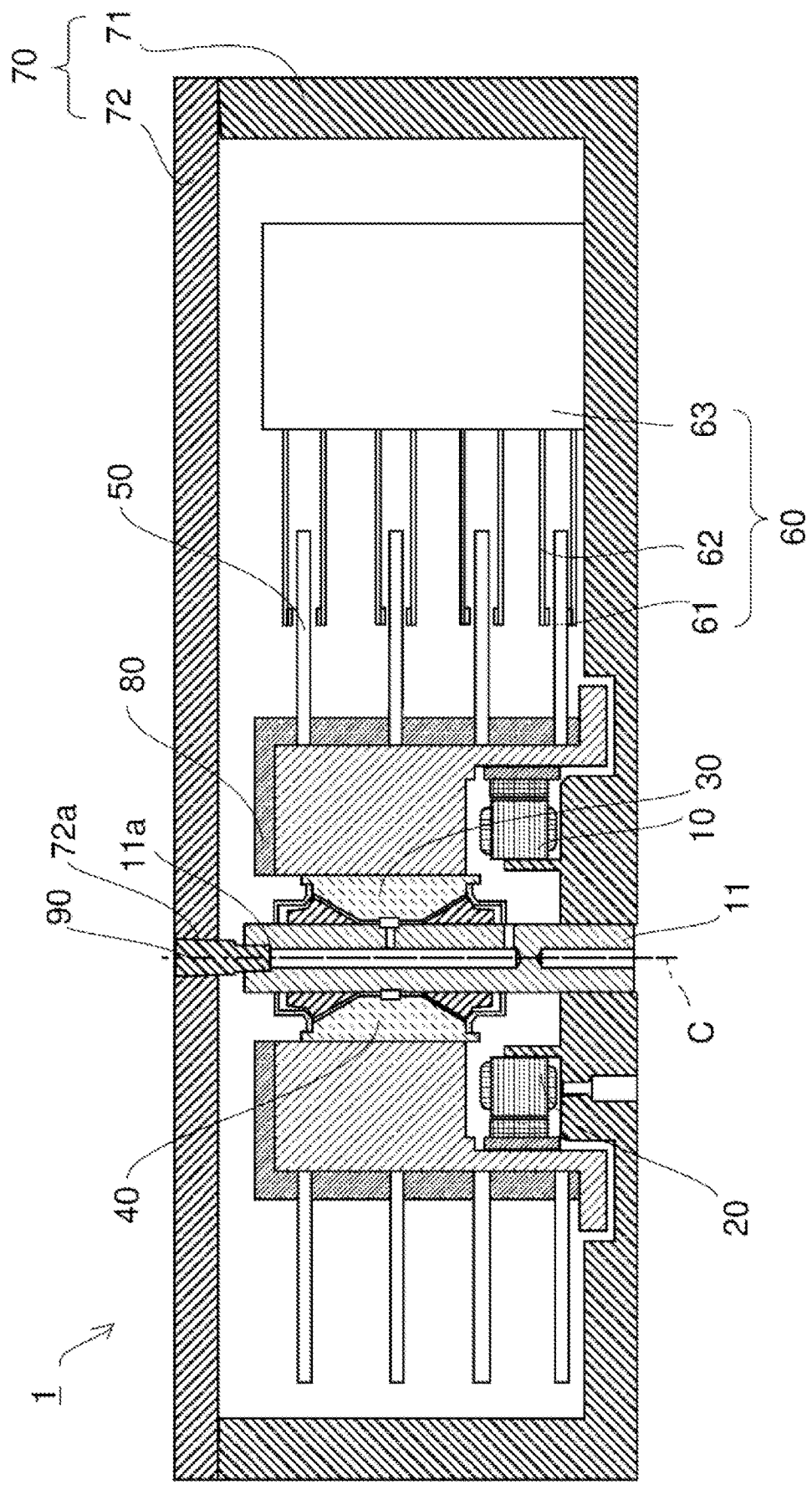
FIG. 1 is a vertical cross-sectional view of a disk drive device according to an exemplary embodiment of the disclosure.

A disk drive device 1 according to an exemplary embodiment of the disclosure will be described. FIG. 1 is a vertical cross-sectional view of the disk drive device 1 according to the exemplary embodiment of the disclosure.

The disk drive device 1 is a hard disk drive. The disk drive device 1 includes a spindle motor 10, a disk 50, an access part 60, and a housing 70.

The housing 70 accommodates the spindle motor 10, the disk 50, and the access part 60 inside. The inside of the housing 70 is filled with gas that has a lower density than air. Specifically, helium gas is filled. In addition, hydrogen gas or the like may be filled instead of helium gas.

The housing 70 is defined by casting and molding a metal die-cast member defined by an aluminum alloy. Nevertheless, metal other than the aluminum alloy may be used for the die-cast member.

The housing 70 includes a base 71 and a cover 72. Inside the housing 70, the disk 50, the spindle motor 10, and the access part 60 are arranged on the base 71. The base 71 has side walls that surround the sides and opens on the upper surface. The opening at the top of the base 71 is closed by the cover 72.

The disk 50 is a disk-shaped information recording medium that has a hole in the center. The disks 50 are mounted on the spindle motor 10 and are arranged in parallel to one another and at equal intervals in the axial direction via a spacer 80.

The access part 60 includes a head 61, an arm 62, and a head moving mechanism 63. The head 61 magnetically reads or writes information from or to the disk 50. The arm 62 supports the head 61. The head moving mechanism 63 moves the head 61 with respect to the disk 50 by moving the arm 62.

Figure 2:
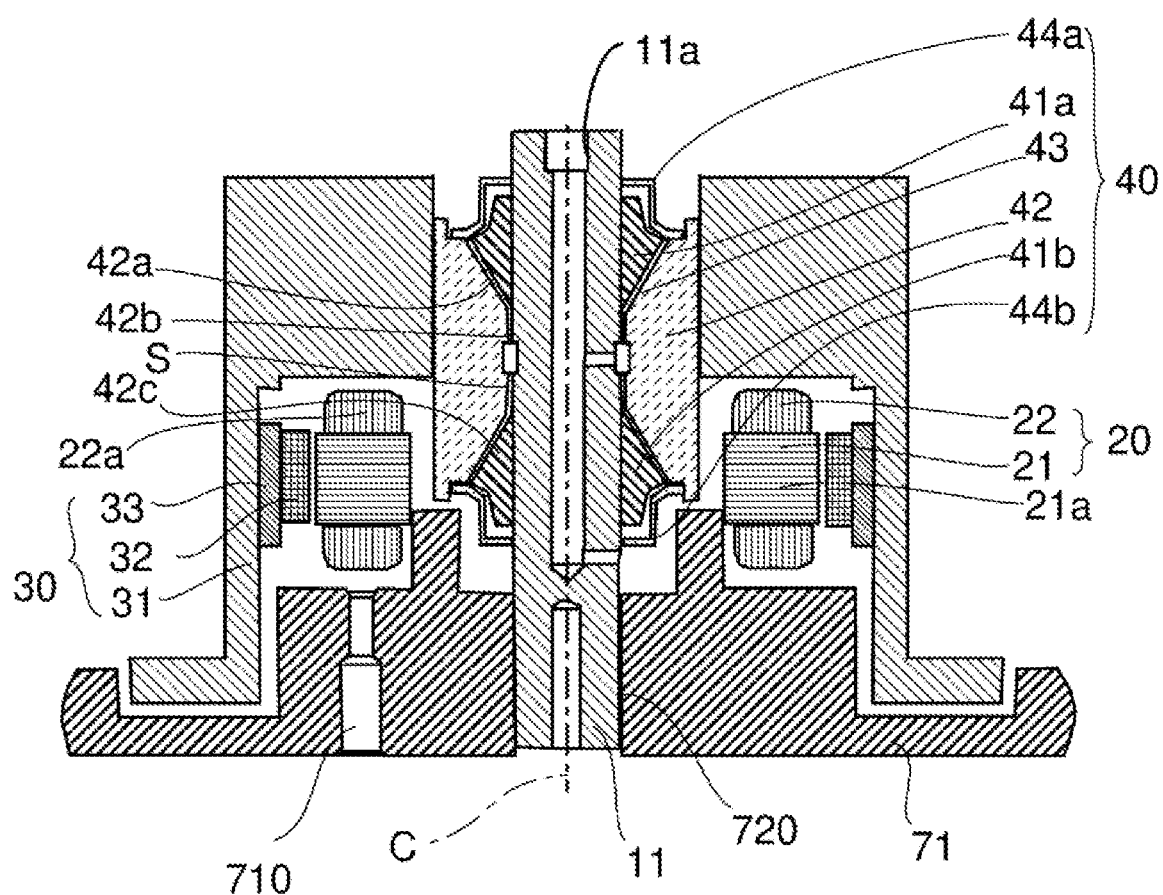
FIG. 2 is a vertical cross-sectional view of a spindle motor according to an exemplary embodiment of the disclosure.

FIG. 2 is a vertical cross-sectional view of the spindle motor 10. The spindle motor 10 rotates the disk 50 with the central axis C as the center while supporting the disk 50. The spindle motor 10 includes a shaft 11, a stator 20, a rotor 30, a bearing 40, and the base 71.

The base 71 is a portion of the housing 70 and also a portion of the spindle motor 10. The base 71 has an insertion hole 720 and a through hole 710 penetrating in the axial direction. The insertion hole 720 is arranged on the central axis C. Details of the through hole 710 will be described later.

The shaft 11 is a columnar member extending along the central axis C that extends in the vertical direction. The lower end of the shaft 11 is press-fitted into the insertion hole 720. As a result, the shaft 11 and the base 71 are fixed. That is, the shaft 11 is arranged on the base 71 and extends in the vertical direction. The shaft 11 has a screw hole 11*a* extending downward in the axial direction from the upper end. The screw hole 11*a* and a cover screw hole 72*a* provided in the cover 72 overlap in the axial direction and are screwed via a screw 90 (see FIG. 1). As a result, the shaft 11 and the cover 72 are fixed. The cover screw hole 72*a* may be a through hole that is not threaded.

The stator 20 surrounds the lower portion of the shaft 11 and is fixed to the base 71. The stator 20 has a stator core 21 and a plurality of coils 22. The stator core 21 is an annular laminated structure in which a plurality of magnetic materials are laminated. The stator core 21 has a plurality of teeth 21*a* projecting outward in the radial direction. The plurality of coils 22 are defined by conductive wires 22*a* wound around the teeth 21*a*. That is, the stator 20 has the coil 22 defined by the wound conductive wire 22*a*, and is arranged on the upper surface of the base 71.

The bearing 40 is a conical hydrodynamic pressure bearing that rotatably supports the rotor 30 around the central axis C. That is, the rotor 30 is rotatably supported with the shaft 11 as the central axis. The bearing 40 includes annular members 41*a* and 41*b* and a sleeve 42.

The annular members 41*a* and 41*b* project outward in the radial direction from the outer peripheral surface of the shaft 11. The annular members 41*a* and 41*b* are vertically fixed to the outer peripheral surface of the shaft 11 at an interval in the axial direction. The annular members 41*a* and 41*b* may be integrally defined with the shaft 11.

The outer peripheral surface of the annular members 41*a* and 41*b* facing the sleeve 42 has a substantially conical shape. The lower portion of the annular member 41*a* has a diameter that gradually decreases toward the lower side, and the upper portion of the annular member 41*b* has a diameter that gradually decreases toward the upper side.

The sleeve 42 is defined in a substantially cylindrical shape and has first, second, and third inner peripheral surfaces 42*a*, 42*b*, and 42*c* in order from above. The first inner peripheral surface 42*a* is inclined in a direction away from the shaft 11 toward the upper side and faces the annular member 41*a*. The second inner peripheral surface 42*b* is defined along the central axis C and faces the outer peripheral surface of the shaft 11. The third inner peripheral surface 42*c* is inclined in a direction away from the shaft 11 toward the lower side and faces the annular member 41*b*.

Further, the sleeve 42 has a minute gap S between the annular members 41*a* and 41*b* and the shaft 11.

A sealing portion 44*a* is attached to the upper surface of the sleeve 42, and a sealing portion 44*b* is attached to the lower surface of the sleeve 42. The sealing portions 44*a* and 44*b* enclose lubricating oil 43 in the minute gap S. The minute gap S may be filled with a fluid such as gas instead of the lubricating oil.

A dynamic pressure groove (not shown) is defined on the first inner peripheral surface 42*a* and the annular member 41*a* facing each other. Further, a dynamic pressure groove (not shown) is defined on the third inner peripheral surface 42*c* and the annular member 41*b* facing each other. The dynamic pressure groove induces hydrodynamic pressure in the lubricating oil 43 when the rotor 30 rotates. A dynamic pressure groove may be defined on one of the first inner peripheral surface 42*a* and the annular member 41*a*, or a dynamic pressure groove may be defined on one of the third inner peripheral surface 42*c* and the annular member 41*b*.

The rotor 30 includes a hub member 31, a magnet 32, and a yoke 33. The hub member 31 is defined in a cylindrical or substantially cylindrical shape, and the sleeve 42 is fixed inside the hub member 31.

The yoke 33 is defined in an annular or substantially annular shape and is fixed to the lower inner peripheral surface of the hub member 31. The magnet 32 is attached to the inner peripheral surface of the yoke 33. As a result, the magnet 32 is held by the hub member 31 via the yoke 33. The inner peripheral surface of the magnet 32 is a magnetic pole surface and faces the outer peripheral surfaces of the plurality of teeth 21*a* in the radial direction.

When a drive current is supplied to the coils 22, magnetic flux is generated in the plurality of teeth 21*a*. Then, torque in the circumferential direction is generated by the interaction of the magnetic flux between the teeth 21*a* and the magnet 32. As a result, the rotor 30 rotates with the central axis C as the center with respect to the stator 20. The disk 50 supported by the hub member 31 rotates with the central axis C as the center together with the rotor 30.

At this time, when the sleeve 42 is rotationally driven with respect to the annular members 41*a* and 41*b*, the dynamic pressure groove induces hydrodynamic pressure in the lubricating oil 43 filled in the minute gap S by the pumping action. As a result, the sleeve 42 is supported in the radial direction and the axial direction in a manner not contacting the annular members 41*a* and 41*b*, and is able to smoothly rotate at a high speed with respect to the annular members 41*a* and 41*b* and the shaft 11.

Figure 3:
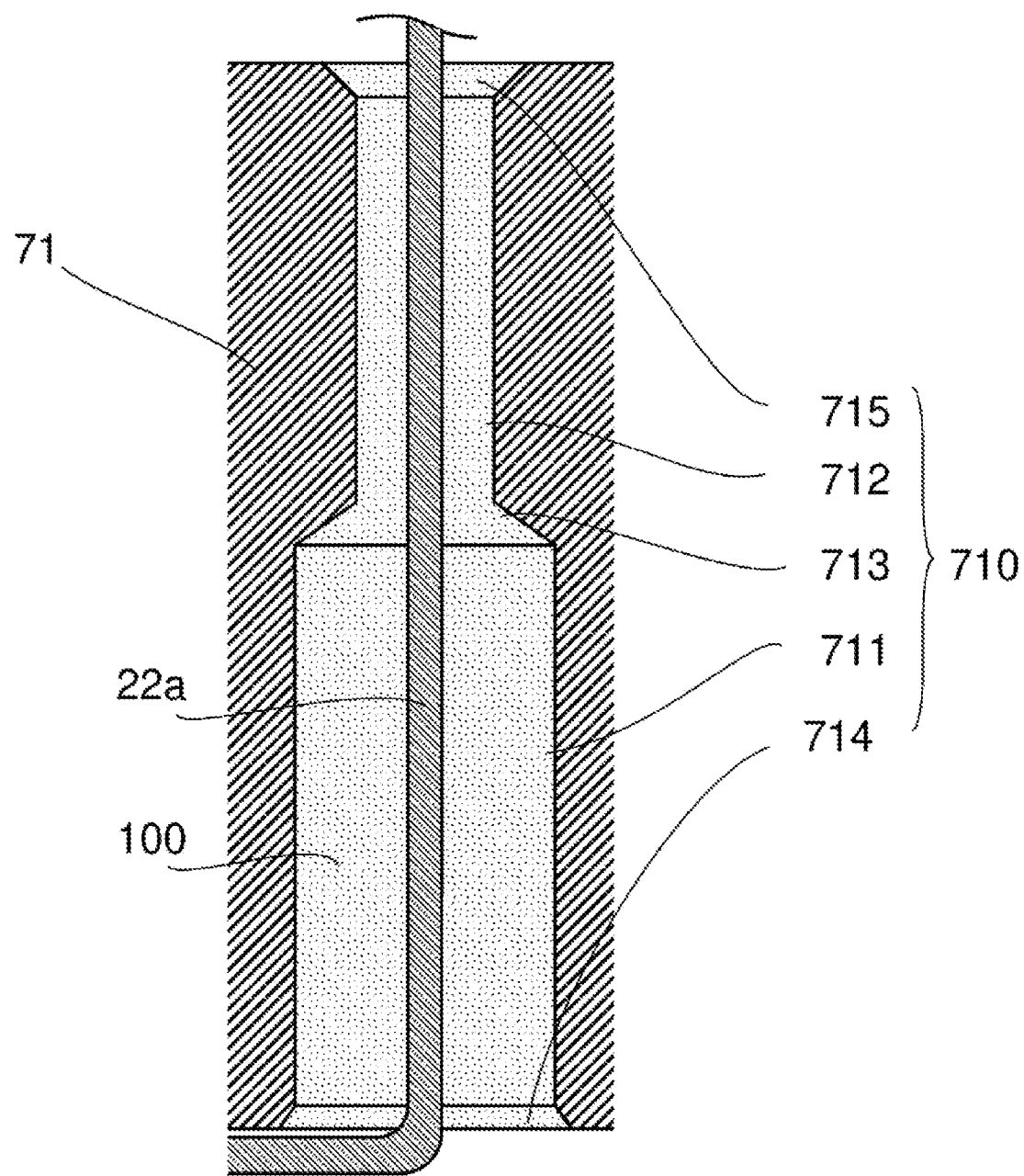
FIG. 3 is an enlarged vertical cross-sectional view of a portion of a base of a spindle motor according to an exemplary embodiment of the disclosure.

FIG. 3 is an enlarged vertical cross-sectional view of a portion of the base 71. The base 71 has the through hole 710 penetrating the base 71 from the upper surface to the lower surface. The through hole 710 extends in parallel to the central axis C. The conductive wire 22*a* is drawn out to the lower surface side through the inside of the through hole 710, and the through hole 710 is sealed by a sealing material 100. The sealing material 100 is filled in the through hole 710 from the lower surface side of the base 71. The sealing material 100 is, for example, an adhesive. The conductive wire 22*a* drawn out to the lower surface side of the base 71 is connected to a wiring board (not shown) arranged on the lower surface side of the base 71.

The through hole 710 has a lower column body 711, an upper column body 712, a connector 713, a lower opening 714, and an upper opening 715. The lower column body 711 is arranged on the lower surface side of the base 71. The upper column body 712 is arranged on the upper surface side of the base 71 with respect to the lower column body 711.

The inner diameter of the upper column body 712 is smaller than the inner diameter of the lower column body 711. That is, the cross-sectional area of the upper column body 712 orthogonal to the axial direction is smaller than the cross-sectional area of the lower column body 711 orthogonal to the axial direction. As a result, when the sealing material 100 is filled in the through hole 710, the sealing material 100 smoothly flows from the lower column body 711 toward the upper column body 712 due to the capillary phenomenon. Therefore, the sealing material 100 is able to reliably flow into the upper end of the upper column body 712. As a result, the sealing material 100 is able to fill in the entire through hole 710, and incomplete filling of the sealing material 100 is able to be prevented. Therefore, it is possible to prevent deterioration of the sealability in the sealed through hole 710. As a result, it is possible to prevent the helium gas filled in the housing 70 from leaking via the through hole 710.

Further, since the sealing material 100 is able to be filled up to the upper end of the upper column body 712 by utilizing the capillary phenomenon, the inner diameter of the upper column body 712 is able to be defined smaller. As a result, it is possible to further prevent deterioration of the sealability in the sealed through hole 710 while preventing incomplete filling of the sealing material 100.

The lower column body 711 and the upper column body 712 are respectively defined in a columnar or substantially columnar shape. As a result, the sealing material 100 smoothly flows into the entire through hole 710.

Further, by defining the inner diameter of the lower column body 711 to be large, the filling speed of the sealing material 100 is able to be increased, thereby preventing bubbles from being generated in the sealing material 100. Therefore, it is possible to further prevent deterioration of the sealability in the sealed through hole 710. In addition, the manufacturing efficiency of the spindle motor 10 is able to be improved.

The filling of the sealing material 100 includes a first filling step and a second filling step. The second filling step is executed after the first filling step is completed. In the first filling step, the sealing material 100 to be filled in the upper column body 712 is filled in the through hole 710. In the second filling step, the sealing material 100 to be filled in the lower column body 711 is filled in the through hole 710. The filling speed in the first filling step is slower than the filling speed in the second filling step.

The connector 713 connects the upper column body 712 and the lower column body 711. The connector 713 is defined with an inner diameter that decreases toward the upper surface of the base 71. As a result, the sealing material 100 flows more smoothly from the lower column body 711 to the upper column body 712 via the connector 713.

The axial length of the lower column body 711 is longer than the axial length of the upper column body 712. As a result, the filling speed of the sealing material 100 is able to be further increased.

Specifically, the axial length of the upper column body 712 is, for example, 2.0 mm or longer and 3.0 mm or shorter. In this range, a distance that is able to sufficiently suppress the leakage of the sealing gas inside the housing 70 due to permeation is able to be secured, and the time to fill to the tip of the upper column body 712 is able to be shortened.

The cross-sectional area of the upper column body orthogonal to the axial direction is, for example, 0.28 mm$^2$ or more and 0.80 mm$^2$ or less. In this range, an area that is able to sufficiently suppress the leakage of the sealing gas inside the housing 70 due to permeation is able to be secured, and the time to fill to the tip of the upper column body 712 is able to be shortened.

Furthermore, the axial length of the lower column body 711 is, for example, 3.0 mm or longer. As a result, when shifting from the first filling step to the second filling step, the axial length of the lower column body 711 sufficient for smoothly switching the filling speed from low speed to high speed is secured. Therefore, it is possible to suppress generation of bubbles and incomplete filling due to a sudden change in the filling speed.

The cross-sectional area of the lower column body 712 orthogonal to the axial direction is, for example, 0.78 mm$^2$ or more and 20.00 mm$^2$ or less. In this range, the filling speed of the sealing material 100 is able to be increased, and the amount of the sealing material 100 required to fill the lower column body 711 is able to be reduced.

The lower opening 714 is arranged at the lower end of the base 71, and is defined with an inner diameter that decreases toward the upper surface of the base 71. By providing the lower opening 714, the sealing material 100 smoothly flows into the lower column body 711 via the lower opening 714. Further, it is possible to suppress the sealing material 100 from rising from the lower surface of the base 71 toward the lower side and solidifying.

The upper opening 715 is arranged at the upper end of the base 71, and is defined with an inner diameter that increases toward the upper surface of the base 71. By providing the lower opening 714, the sealing material 100 tends to accumulate on the upper opening 715 due to surface tension. Therefore, it is possible to prevent the sealing material 100 from overflowing around the through hole 710 on the upper surface of the base 71. It is possible to suppress the sealing material 100 from rising from the upper surface of the base 71 toward the upper side and solidifying.

In this exemplary embodiment, the lower column body 711 and the upper column body 712 are respectively defined in a columnar or substantially columnar shape. However, one of the lower column body 711 and the upper column body 712 may be defined in a columnar or substantially columnar shape, and the other may be defined in an elliptical columnar shape or a polygonal columnar shape. Besides, one of the lower column body 711 and the upper column body 712 may be defined in a truncated conical shape. At this time, the inner diameter of the lower column body 711 or the upper column body 712 is defined to decrease toward the upper surface of the base 71. As a result, the sealing material 100 flows more smoothly from the lower column body 711 to the upper column body 712.

Further, this exemplary embodiment describes that the spindle motor 10 has a hydrodynamic pressure bearing. However, the spindle motor may have a bearing such as a ball bearing as the bearing 40.

The disclosure is able to be used in a housing for a disk drive device such as a hard disk drive.

Features of the above-described exemplary embodiments and the modifications thereof may be combined appropriately as long as no conflict arises.

While exemplary embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A spindle motor, comprising:
   a base;
   a shaft arranged on the base and extending in a vertical direction;
   a stator comprising a coil defined by a wound conductive wire and arranged on an upper surface of the base; and
   a rotor rotatably supported with the shaft as a central axis,
   wherein the base has a through hole that penetrates the base from the upper surface to a lower surface, the conductive wire is drawn out to a lower surface side through inside of the through hole, and the through hole is sealed by a sealing material,
   the through hole comprises a lower column body arranged on the lower surface side of the base and an upper column body arranged on an upper surface side of the base with respect to the lower column body, and a cross-sectional area of the upper column body orthogonal to an axial direction is smaller than a cross-sectional area of the lower column body orthogonal to the axial direction, wherein an axial length of the upper column body is shorter than an axial length of the lower column body, or the axial length of the lower column is same as the axial length of the upper column body.

2. The spindle motor according to claim 1, wherein at least one of the upper column body and the lower column body is defined in a columnar shape.

3. The spindle motor according to claim 1, wherein the axial length of the lower column body is longer than the axial length of the upper column body.

4. The spindle motor according to claim 1, wherein the through hole comprises a connector that connects the upper column body and the lower column body, and the connector is defined with an inner diameter that decreases toward the upper surface of the base.

5. The spindle motor according to claim 1, wherein an axial length of the upper column body is 2.0 mm or longer and 3.0 mm or shorter.

6. The spindle motor according to claim 1, wherein the cross-sectional area of the upper column body orthogonal to the axial direction is 0.28 $mm^2$ or more and 0.80 $mm^2$ or less.

7. The spindle motor according to claim 1, wherein an axial length of the lower column body is 3.0 mm or longer.

8. The spindle motor according to claim 1, wherein the cross-sectional area of the lower column body orthogonal to the axial direction is 0.78 $mm^2$ or more and 20.00 $mm^2$ or less.

9. The spindle motor according to claim 1, wherein the through hole has an upper opening that is arranged at an upper end of the base and is defined with an inner diameter increasing toward the upper surface of the base.

10. The spindle motor according to claim 1, wherein the through hole has a lower opening that is arranged at a lower end of the base and is defined with an inner diameter decreasing toward the upper surface of the base.

11. A disk drive device, comprising:
the spindle motor according to claim 1;
a disk rotated by the spindle motor;
an access part reading and/or writing information from and/or to the disk; and
a housing accommodating the spindle motor, the disk, and the access part and comprising the base.

12. The disk drive device according to claim 11, wherein inside of the housing is filled with gas that has a lower density than air.

* * * * *